US012683506B2

(12) United States Patent
Shen

(10) Patent No.: US 12,683,506 B2
(45) Date of Patent: Jul. 14, 2026

(54) SWITCHING POWER SUPPLY AND ZERO VOLTAGE SWITCHING CONTROL METHOD THEREOF

(71) Applicant: MIPTECH LIMITED, Central Hong Kong (CN)

(72) Inventor: Jun Shen, Central Hong Kong (CN)

(73) Assignee: MIPTECH LIMITED (CN)

( * ) Notice: Subject to any disclaimer, the term of this patent is extended or adjusted under 35 U.S.C. 154(b) by 245 days.

(21) Appl. No.: 18/690,583

(22) PCT Filed: Sep. 7, 2022

(86) PCT No.: PCT/CN2022/117528
§ 371 (c)(1),
(2) Date: Mar. 8, 2024

(87) PCT Pub. No.: WO2023/036176
PCT Pub. Date: Mar. 16, 2023

(65) Prior Publication Data
US 2025/0007412 A1     Jan. 2, 2025

(30) Foreign Application Priority Data

Sep. 8, 2021    (CN) .......................... 202111051012.3

(51) Int. Cl.
*H02M 3/335*          (2006.01)
*H02M 1/00*           (2007.01)
(Continued)

(52) U.S. Cl.
CPC ..... *H02M 3/33592* (2013.01); *H02M 1/0058* (2021.05); *H02M 1/44* (2013.01); *H02M 1/36* (2013.01); *H02M 3/33523* (2013.01)

(58) Field of Classification Search
CPC .. H02M 3/33592; H02M 1/0058; H02M 1/44; H02M 1/36
See application file for complete search history.

(56) References Cited

U.S. PATENT DOCUMENTS 9,287,792 B2 *   3/2016   Telefus ............. H02M 3/33576
10,170,974 B1    1/2019   Oh et al.
(Continued)

FOREIGN PATENT DOCUMENTS

CN        105529791        4/2016
CN        105529799        4/2016
(Continued)

OTHER PUBLICATIONS

Office action dated 2025-08-01 from corresponding Chinese Application No. 202111051012.3.

(Continued)

*Primary Examiner* — Gustavo A Rosario-Benitez
(74) *Attorney, Agent, or Firm* — Terrence J. Edwards; TechLaw Ventures, PLLC

(57)          ABSTRACT

A switching power supply control method includes the following: when a switching time interval of the second switching transistor being less than or equal to a first preset value after the high-voltage startup of the switching power supply, the secondary control module acquires a voltage waveform at a second connection point between the secondary winding and the second switching transistor; when the voltage waveform at the second connection point has not achieved zero voltage switching, the secondary control module adjusts the cut-off current of the second switching transistor until a voltage waveform at a first connection point between the primary winding and the first switching transistor just reaches zero; and when the voltage waveform at the first connection point just reaches zero, the primary control module controls the first switching transistor to be turned on.

9 Claims, 5 Drawing Sheets

(51) Int. Cl.
    *H02M 1/36*          (2007.01)
    *H02M 1/44*          (2007.01)

(56)             References Cited

U.S. PATENT DOCUMENTS

| | | | |
|---|---|---|---|
| 10,205,377 | B1 * | 2/2019 | Bianco ................. H02M 1/083 |
| 11,133,747 | B1 * | 9/2021 | Radic ................. H02M 1/0058 |
| 2008/0259656 | A1 * | 10/2008 | Grant ............... H02M 3/33523 |
| | | | 363/21.18 |
| 2015/0015071 | A1 | 1/2015 | Deboy et al. |
| 2015/0207420 | A1 | 7/2015 | Wang et al. |
| 2017/0288440 | A1 * | 10/2017 | Ye ............................ H02J 7/02 |
| 2020/0036280 | A1 * | 1/2020 | Yang ................ H02M 3/33592 |
| 2020/0169180 | A1 * | 5/2020 | Jitaru ............... H02M 3/33592 |
| 2020/0280264 | A1 * | 9/2020 | Kado ............... H02M 3/33523 |
| 2021/0111634 | A1 * | 4/2021 | Chang ............. H02M 3/33592 |

FOREIGN PATENT DOCUMENTS

| | | |
|---|---|---|
| CN | 112134443 | 12/2020 |
| CN | 212677084 | 3/2021 |
| CN | 113131747 A | 7/2021 |
| CN | 113315378 A | 8/2021 |
| CN | 113765365 | 12/2021 |
| WO | 03/088460 A2 | 10/2003 |

OTHER PUBLICATIONS

International Search Report dated 2022-12-05 from corresponding PCT Application No. PCT/CN2022/117528.

* cited by examiner

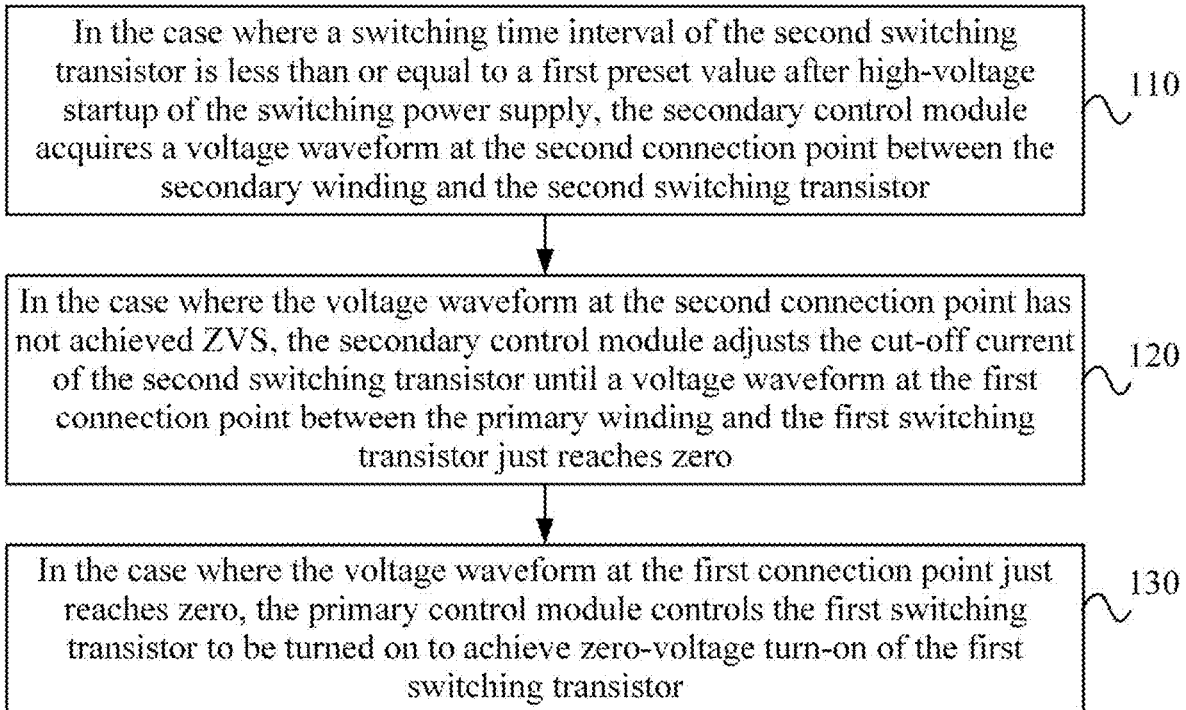

In the case where a switching time interval of the second switching transistor is less than or equal to a first preset value after high-voltage startup of the switching power supply, the secondary control module acquires a voltage waveform at the second connection point between the secondary winding and the second switching transistor    110

In the case where the voltage waveform at the second connection point has not achieved ZVS, the secondary control module adjusts the cut-off current of the second switching transistor until a voltage waveform at the first connection point between the primary winding and the first switching transistor just reaches zero    120

In the case where the voltage waveform at the first connection point just reaches zero, the primary control module controls the first switching transistor to be turned on to achieve zero-voltage turn-on of the first switching transistor    130

FIG. 2

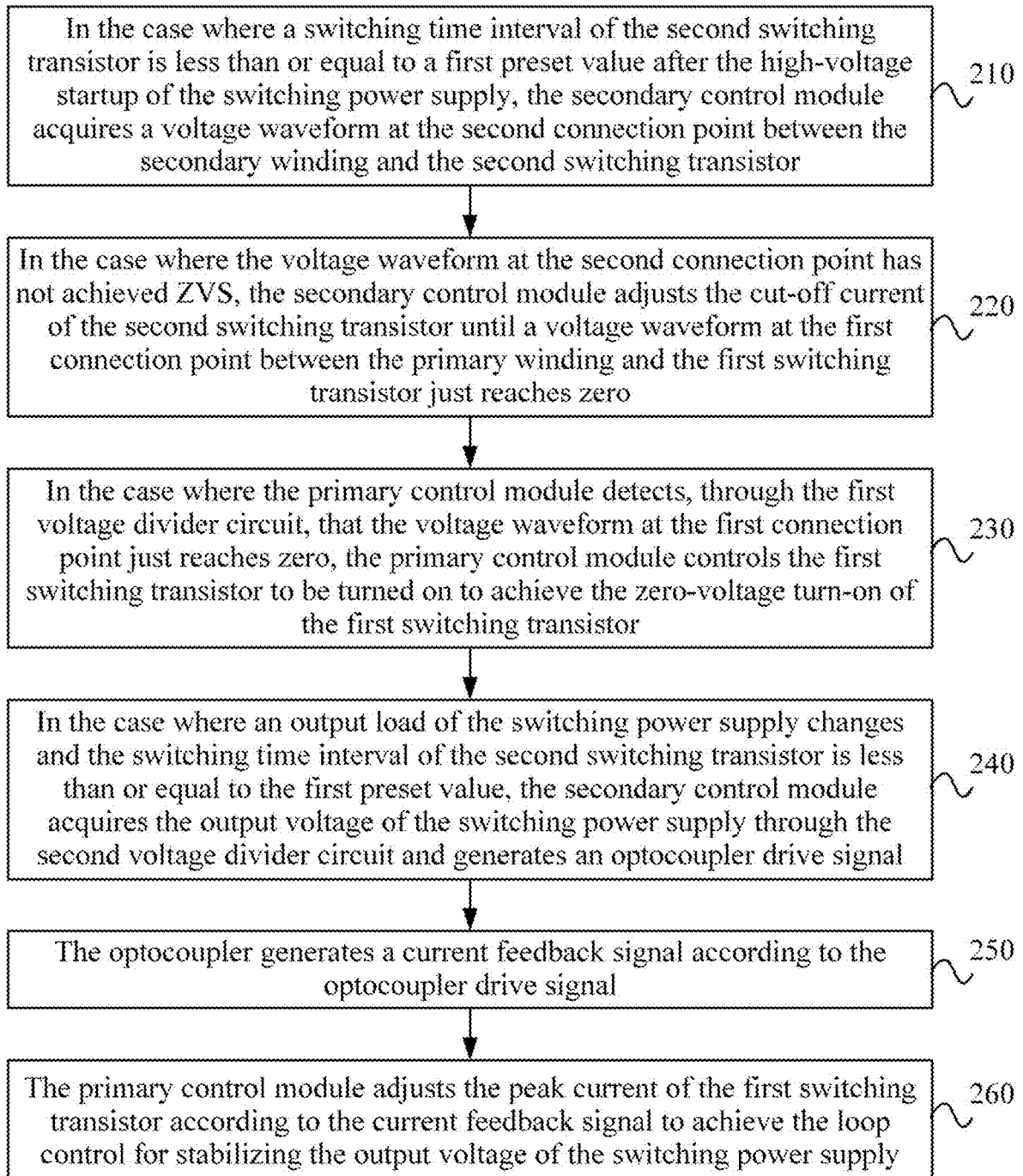

In the case where a switching time interval of the second switching transistor is less than or equal to a first preset value after the high-voltage startup of the switching power supply, the secondary control module acquires a voltage waveform at the second connection point between the secondary winding and the second switching transistor          210

In the case where the voltage waveform at the second connection point has not achieved ZVS, the secondary control module adjusts the cut-off current of the second switching transistor until a voltage waveform at the first connection point between the primary winding and the first switching transistor just reaches zero          220

In the case where the primary control module detects, through the first voltage divider circuit, that the voltage waveform at the first connection point just reaches zero, the primary control module controls the first switching transistor to be turned on to achieve the zero-voltage turn-on of the first switching transistor          230

In the case where an output load of the switching power supply changes and the switching time interval of the second switching transistor is less than or equal to the first preset value, the secondary control module acquires the output voltage of the switching power supply through the second voltage divider circuit and generates an optocoupler drive signal          240

The optocoupler generates a current feedback signal according to the optocoupler drive signal          250

The primary control module adjusts the peak current of the first switching transistor according to the current feedback signal to achieve the loop control for stabilizing the output voltage of the switching power supply          260

FIG. 3

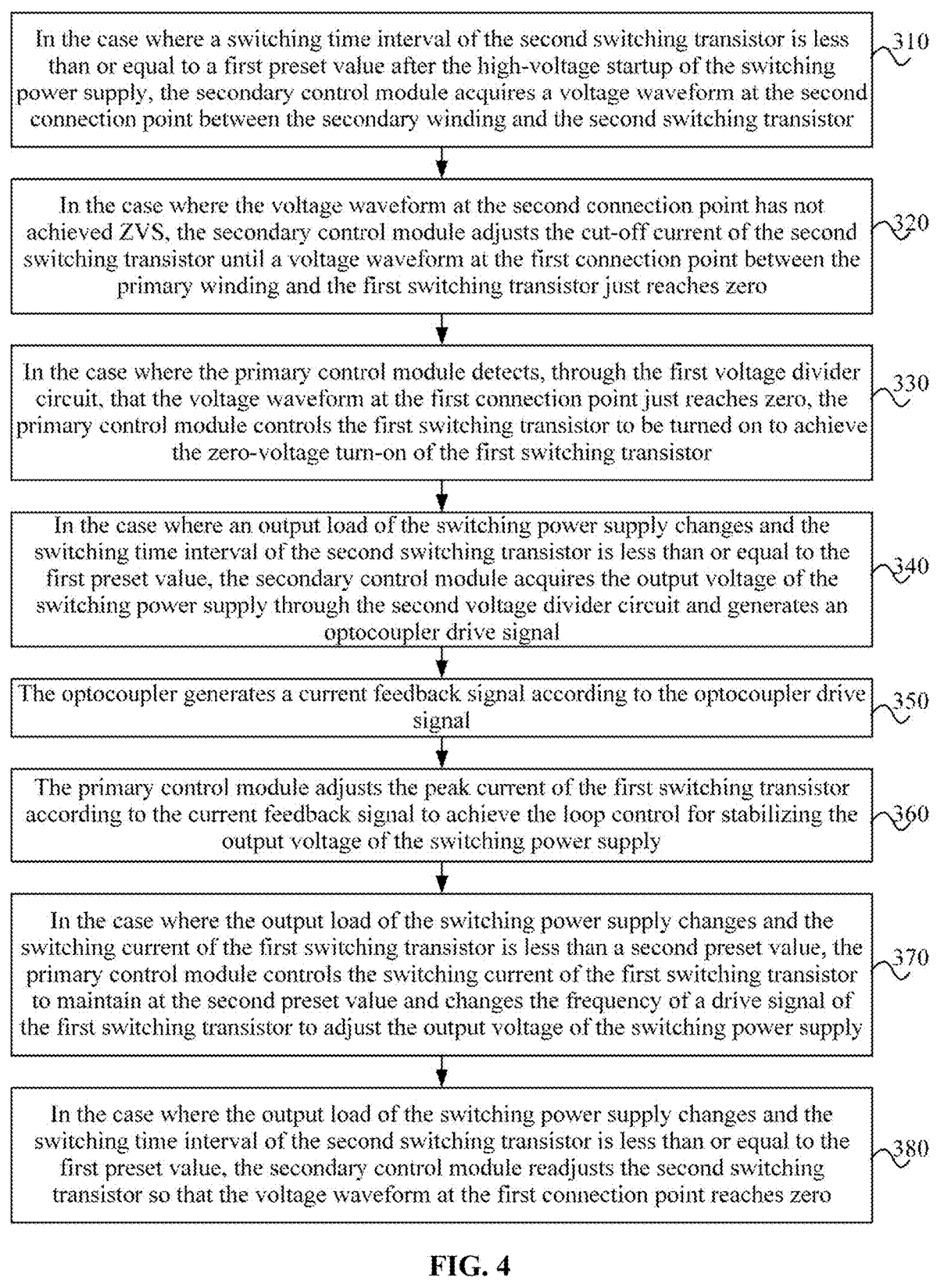

In the case where a switching time interval of the second switching transistor is less than or equal to a first preset value after the high-voltage startup of the switching power supply, the secondary control module acquires a voltage waveform at the second connection point between the secondary winding and the second switching transistor ⟶ 310

In the case where the voltage waveform at the second connection point has not achieved ZVS, the secondary control module adjusts the cut-off current of the second switching transistor until a voltage waveform at the first connection point between the primary winding and the first switching transistor just reaches zero ⟶ 320

In the case where the primary control module detects, through the first voltage divider circuit, that the voltage waveform at the first connection point just reaches zero, the primary control module controls the first switching transistor to be turned on to achieve the zero-voltage turn-on of the first switching transistor ⟶ 330

In the case where an output load of the switching power supply changes and the switching time interval of the second switching transistor is less than or equal to the first preset value, the secondary control module acquires the output voltage of the switching power supply through the second voltage divider circuit and generates an optocoupler drive signal ⟶ 340

The optocoupler generates a current feedback signal according to the optocoupler drive signal ⟶ 350

The primary control module adjusts the peak current of the first switching transistor according to the current feedback signal to achieve the loop control for stabilizing the output voltage of the switching power supply ⟶ 360

In the case where the output load of the switching power supply changes and the switching current of the first switching transistor is less than a second preset value, the primary control module controls the switching current of the first switching transistor to maintain at the second preset value and changes the frequency of a drive signal of the first switching transistor to adjust the output voltage of the switching power supply ⟶ 370

In the case where the output load of the switching power supply changes and the switching time interval of the second switching transistor is less than or equal to the first preset value, the secondary control module readjusts the second switching transistor so that the voltage waveform at the first connection point reaches zero ⟶ 380

FIG. 4

SWITCHING POWER SUPPLY AND ZERO VOLTAGE SWITCHING CONTROL METHOD THEREOF

CROSS REFERENCE TO RELATED APPLICATIONS

This application is a National Stage application filed under 35 U.S.C. § 371 based on International Patent Application No. PCT/CN2022/117528, filed on Sep. 7, 2022, which claims priority to Chinese Patent Application 202111051012.3, filed with the China National Intellectual Property Administration (CNIPA) on Sep. 8, 2021, the disclosures of each of which are incorporated herein by reference in their entireties as if fully set forth herein.

TECHNICAL FIELD

Embodiments of the present application relate to the field of power supply technologies, for example, a switching power supply control method and a switching power supply.

BACKGROUND

In the field of power supplies, an isolated switching power supply plays an important role. As the most common type of isolated switching power supply, a flyback alternating current-direct current (AC-DC) isolated switching power supply is widely used in the power supply process of electrical appliances such as mobile phones, tablet computers, and household appliances.

A typical flyback AC-DC isolated switching power supply has large primary switching losses, low efficiency, and large electromagnetic interference (EMI), limiting the increase in switching frequency and hindering the miniaturization of the switching power supply. Based on this, the active clamp flyback design that can achieve zero voltage switching (ZVS) has emerged. However, compared with the typical flyback AC-DC isolated switching power supply, the active clamp flyback AC-DC isolated switching power supply requires multiple additional control loops and corresponding hardware circuit structures. Therefore, the structure of the switching power supply tends to be complex with higher hardware cost and higher level of power control complexity.

SUMMARY

Embodiments of the present application provide a switching power supply control method and a switching power supply.

In a first aspect, an embodiment of the present application provides a switching power supply control method. A switching power supply includes a primary winding, a secondary winding, a primary control module, a secondary control module, a first switching transistor connected to the primary winding, and a second switching transistor connected to the secondary winding.

The control method includes the steps described below.

In response to a switching time interval of the second switching transistor being less than or equal to a first preset value after high-voltage startup of the switching power supply, the secondary control module acquires a voltage waveform at a second connection point between the secondary winding and the second switching transistor.

In response to the voltage waveform at the second connection point not achieving ZVS, the secondary control module adjusts the cut-off current of the second switching transistor until a voltage waveform at a first connection point between the primary winding and the first switching transistor just reaches zero.

In response to the voltage waveform at the first connection point just reaching zero, the primary control module controls the first switching transistor to be turned on to achieve zero-voltage turn-on of the first switching transistor.

In a second aspect, an embodiment of the present application further provides a switching power supply. The switching power supply includes a primary winding, a secondary winding, a primary control module, a secondary control module, a first switching transistor connected to the primary winding, and a second switching transistor connected to the secondary winding.

The primary winding is configured to store energy in response to the first switching transistor being turned on.

The secondary winding is configured to generate output voltage in response to the second switching transistor being turned on.

The first switching transistor is configured to be turned on or off according to a drive signal generated by the primary control module.

The second switching transistor is configured to be turned on or off according to a drive signal generated by the secondary control module.

The primary control module is configured to, in response to a voltage waveform at a first connection point just reaching zero, control the first switching transistor to be turned on; the primary control module is further configured to adjust the peak current of the first switching transistor according to a current feedback signal; and the primary control module is further configured to, in response to changing in an output load of the switching power supply and the switching current of the first switching transistor being less than a second preset value, control the switching current of the first switching transistor to maintain at the second preset value and change the frequency of a drive signal of the first switching transistor.

The secondary control module is configured to, in response to a switching time interval of the second switching transistor being less than or equal to a first preset value after high-voltage startup of the switching power supply, acquire a voltage waveform at a second connection point between the secondary winding and the second switching transistor; the secondary control module is further configured to, in response to the voltage waveform at the second connection point not achieving ZVS, adjust the cut-off current of the second switching transistor until the voltage waveform at the first connection point between the primary winding and the first switching transistor just reaches zero; the secondary control module is further configured to, in response to changing in the output load of the switching power supply, acquire the output voltage of the switching power supply through a second voltage divider circuit and generate an optocoupler drive signal; and the secondary control module is further configured to, in response to changing in the output load of the switching power supply and the switching time interval of the second switching transistor being less than or equal to the first preset value, readjust the second switching transistor so that the voltage waveform at the first connection point reaches zero.

BRIEF DESCRIPTION OF DRAWINGS

FIG. 2 is a flowchart of a switching power supply control method according to an embodiment of the present application;

FIG. 3 is a flowchart of another switching power supply control method according to an embodiment of the present application;

FIG. 4 is a flowchart of another switching power supply control method according to an embodiment of the present application.

DETAILED DESCRIPTION

Figure 1:
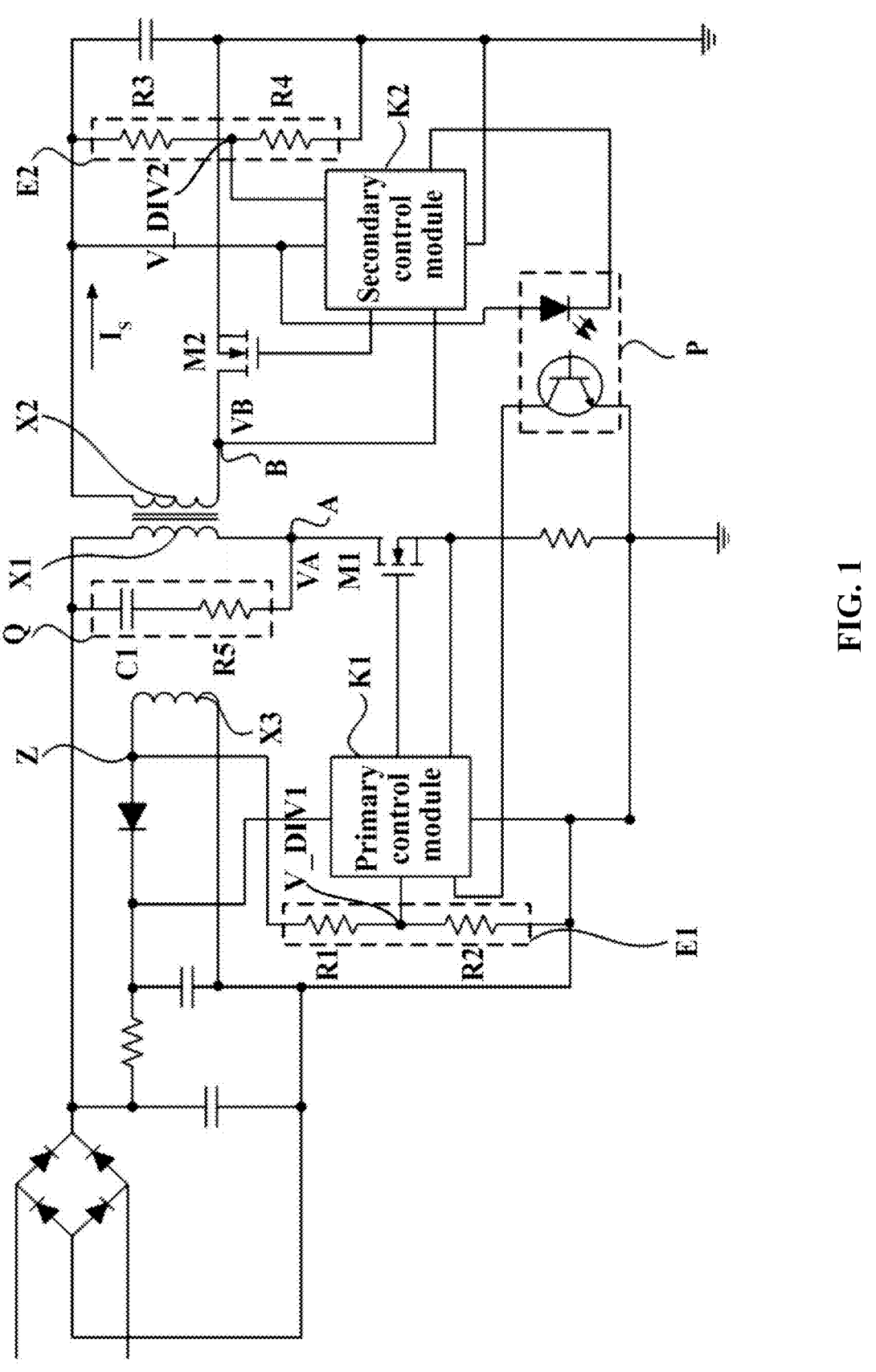
FIG. 1 is a structural diagram of a switching power supply according to an embodiment of the present application.

The present application is further described in detail hereinafter in conjunction with the drawings and embodiments. It is to be understood that the examples described herein are intended to illustrate the present application and not to limit the present application. Additionally, it is to be noted that for ease of description, only part, not all, of structures related to the present application are illustrated in the drawings.

FIG. 1 is a structural diagram of a switching power supply according to an embodiment of the present application, and FIG. 2 is a flowchart of a switching power supply control method according to an embodiment of the present application. The embodiment of the present application applies to the power supply of any device with a typical flyback AC-DC isolated switching power supply structure. The method can be, but is not limited to, performed by the switching power supply in the embodiment of the present application as the execution subject. The execution subject may be implemented in software and/or hardware. The switching power supply includes a primary winding X1, a secondary winding X2, a primary control module (also referred to as a primary winding control module) K1, a secondary control module (also referred to as a secondary winding control module) K2, a first switching transistor M1 connected to the primary winding X1, a second switching transistor M2 connected to the secondary winding X2, a first connection point A between the primary winding X1 and the first switching transistor M1, and a second connection point B between the secondary winding X2 and the second switching transistor M2. As shown in FIG. 2, the method includes the steps described below.

In step 110, in the case where a switching time interval of the second switching transistor is less than or equal to a first preset value after high-voltage startup of the switching power supply, the secondary control module acquires a voltage waveform at the second connection point between the secondary winding and the second switching transistor.

A high-voltage startup method for the switching power supply can be achieved by acquiring electrical power from the bus voltage through the existing high-voltage startup circuit of the switching power supply. The first preset value may be set using the initial setup value of the switching power supply, or it can be a user-defined value. The switching time interval of the second switching transistor M2 refers to the time interval between the turn-off and the turn-on of the second switching transistor M2.

It is to be understood that after the high-voltage startup of the switching power supply, the switching power supply adaptively adjusts the output voltage according to changes in the output load; if the switching time interval of the second switching transistor M2 is less than or equal to the first preset value, it indicates that the load impedance is relatively low at the current stage, the current flowing through the load is relatively large, and the switching power supply works in a heavy load state. Based on this, if the switching time interval of the second switching transistor M2 is less than or equal to the first preset value, it means that the switching power supply is in the heavy load state.

In step 120, in a case where the voltage waveform at the second connection point has not achieved ZVS, the secondary control module adjusts the cut-off current of the second switching transistor until a voltage waveform at the first connection point between the primary winding and the first switching transistor just reaches zero.

The cut-off current of the second switching transistor refers to the current at which the second switching transistor turns off. The adjustment process of the cut-off current of the second switching transistor M2 may be to increase, may be to decrease, may be to first increase and then decrease, may be to first decrease and then increase, or may be any form of adjustment process with repeated oscillations. The preceding adjustment process of the cut-off current of the second switching transistor M2 may be changed adaptively according to the specific settings and parameter selection of the switching power supply, which is not limited in the embodiment of the present application.

In step 130, in the case where the voltage waveform at the first connection point just reaches zero, the primary control module controls the first switching transistor to be turned on to achieve zero-voltage turn-on of the first switching transistor.

Since the switching power supply provided in this embodiment has the typical flyback AC-DC isolated switching power supply structure, the first switching transistor M1 and the second switching transistor M2 cannot be turned on simultaneously.

For example, referring to FIG. 1, it is to be understood that the process of turning off the first switching transistor is described below.

The primary control module K1 acquires the feedback signal from an optocoupler P to generate a voltage reference value for controlling the voltage at the source of the first switching transistor M1, which corresponds to the peak current of the first switching transistor M1. In the case where the voltage at the source of the first switching transistor M1 reaches the voltage reference value, the primary control module K1 controls the first switching transistor M1 to be turned off.

The embodiments of the present application provide a switching power supply control method and a switching power supply. The method includes: in the case where a switching time interval of the second switching transistor is less than or equal to a first preset value after the high-voltage startup of the switching power supply, acquiring, by the secondary control module, a voltage waveform at a second connection point between the secondary winding and the second switching transistor; in the case where the voltage waveform at the second connection point has not achieved ZVS, adjusting, by the secondary control module, the cut-off current of the second switching transistor until a voltage waveform at a first connection point between the primary winding and the first switching transistor just reaches zero; and in the case where the voltage waveform at the first connection point just reaches zero, controlling, by the primary control module, the first switching transistor to be turned on to achieve zero-voltage turn-on of the first switching transistor.

Compared with a typical flyback AC-DC isolated switching power supply, the embodiment of the present application does not add additional control loops and circuit structures, therefore, the circuit cost and control complexity of the switching power supply are not increased. In addition, the typical flyback AC-DC isolated switching power supply cannot achieve ZVS. In the embodiment of the present application, a secondary control module K2 acquires the voltage waveform at the second connection point B and adjusts the cut-off current of the second switching transistor M2; and the primary control module K1 controls the first switching transistor M1 to be turned on in the case where the voltage waveform at the first connection point A just reaches zero, so as to ultimately achieve the ZVS of the switching power supply, thereby not only reducing the switching losses of the switching power supply but also improving the EMI characteristics of the switching power supply.

Compared with the existing active clamp flyback AC-DC isolated switching power supply, the embodiment of the present application does not require additional control loops and corresponding hardware circuit structures. Therefore, the circuit structure is simple, the control is easy, and the cost is relatively low.

FIG. 3 is a flowchart of another switching power supply control method according to an embodiment of the present application. Based on the preceding embodiments, in an embodiment, referring to FIG. 1, the switching power supply further includes an auxiliary winding X3 and a first voltage divider circuit E1. The first voltage divider circuit E1 is connected between the auxiliary winding X3 and a voltage detection terminal of the primary control module K1.

The step of in the case where the voltage waveform at the first connection point just reaches zero, controlling, by the primary control module, the first switching transistor to be turned on to achieve the zero-voltage turn-on of the first switching transistor includes: in the case where the primary control module detects, through the first voltage divider circuit, that the voltage waveform at the first connection point just reaches zero, controlling, by the primary control module, the first switching transistor to be turned on to achieve the zero-voltage turn-on of the first switching transistor.

The preceding embodiments describe that in the case where the voltage waveform at the first connection point just reaches zero, the primary control module controls the first switching transistor to be turned on to achieve the zero-voltage turn-on of the first switching transistor. In this embodiment, this operation further includes the following operation: in the case where the primary control module detects, through the first voltage divider circuit, that the voltage waveform at the first connection point just reaches zero, the primary control module controls the first switching transistor to be turned on to achieve the zero-voltage turn-on of the first switching transistor.

In an embodiment, the switching power supply further includes the optocoupler P and a second voltage divider circuit E2, where the optocoupler P is connected between an optocoupler output port of the primary control module K1 and a current drive port of the secondary control module K2, and the second voltage divider circuit E2 is connected between the secondary winding X2 and an output voltage detection terminal of the secondary control module K2.

The switching power supply control method further includes the steps described below.

In the case where an output load of the switching power supply changes and the switching time interval of the second switching transistor is less than or equal to the first preset value, the secondary control module acquires the output voltage of the switching power supply through the second voltage divider circuit and generates an optocoupler drive signal.

The optocoupler generates a current feedback signal according to the optocoupler drive signal.

The primary control module adjusts the peak current of the first switching transistor according to the current feedback signal to achieve a loop control for stabilizing the output voltage of the switching power supply.

As shown in FIG. 3, the method includes the steps described below.

In step 210, in the case where a switching time interval of the second switching transistor is less than or equal to a first preset value after the high-voltage startup of the switching power supply, the secondary control module acquires a voltage waveform at the second connection point between the secondary winding and the second switching transistor.

In step 220, in the case where the voltage waveform at the second connection point has not achieved ZVS, the secondary control module adjusts the cut-off current of the second switching transistor until a voltage waveform at the first connection point between the primary winding and the first switching transistor just reaches zero.

In step 230, in the case where the primary control module detects, through the first voltage divider circuit, that the voltage waveform at the first connection point just reaches zero, the primary control module controls the first switching transistor to be turned on to achieve the zero-voltage turn-on of the first switching transistor.

In the circuit structure of the typical flyback AC-DC isolated switching power supply, since the voltage detection terminal of the primary control module K1 is not directly connected to the first connection point A, the primary control module K1 cannot directly acquire the voltage waveform at the first connection point A.

Based on this, the typical flyback AC-DC isolated switching power supply can be configured with the auxiliary winding X3 and the first voltage divider circuit E1, and the first voltage divider circuit E1 is connected between the auxiliary winding X3 and the voltage detection terminal of the primary control module K1 so that the voltage waveform at the first connection point A can be indirectly acquired through the first voltage divider circuit E1.

For example, in other embodiments, in the case where the primary control module K1 detects, through the first voltage divider circuit E1, that the voltage waveform at the first connection point A approaches zero, the primary control module K1 controls the first switching transistor M1 to be turned on to achieve the zero-voltage turn-on of the first switching transistor.

In step 240, in the case where an output load of the switching power supply changes and the switching time interval of the second switching transistor is less than or equal to the first preset value, the secondary control module acquires the output voltage of the switching power supply through the second voltage divider circuit and generates an optocoupler drive signal.

It is to be understood that the optocoupler drive signal may be any current signal, and the specific current of the optocoupler drive signal is related to the specific model and structural parameters of the optocoupler P, which is not limited in the embodiment of the present application.

In step 250, the optocoupler generates a current feedback signal according to the optocoupler drive signal.

It is to be understood that the current feedback signal may be any current signal, and the specific value of the current feedback signal is related to the specific model and structural parameters of the optocoupler P, which is not limited in the embodiment of the present application.

In step 260, the primary control module adjusts the peak current of the first switching transistor according to the current feedback signal to achieve the loop control for stabilizing the output voltage of the switching power supply.

It is to be understood that when the output load of the switching power supply changes and the switching time interval of the second switching transistor M2 is less than or equal to the first preset value, the switching power supply is in the heavy load state and the output load of the switching power supply changes. In this case, the secondary control module K2 needs to control the primary control module K1 to change the output voltage of the switching power supply, thereby achieving the controllable adjustment of the output voltage.

Based on this, firstly, the secondary control module K2 directly calculates the output voltage of the switching power supply through the second voltage divider circuit E2 and correspondingly generates the photocoupler drive signal to drive the photocoupler P, where the second voltage divider circuit E2 is connected between the secondary winding X2 and the output voltage detection terminal of the secondary control module K2. Secondly, the optocoupler P generates the current feedback signal according to the optocoupler drive signal. Finally, the primary control module K1 can adjust the conduction time of the first switching transistor M1 according to the current feedback signal to adjust the peak current of the first switching transistor M1, thereby achieving the loop control for stabilizing the output voltage of the switching power supply.

Based on the implementation of the ZVS of the switching power supply in the preceding embodiments, in this embodiment, the loop control for stabilizing the output voltage of the switching power supply can be achieved in the case where the switching power supply is in the heavy load state and the output load of the switching power supply changes. Compared with the related art, in this embodiment, the switching losses of the switching power supply are reduced and the EMI characteristics of the switching power supply are improved without increasing the additional circuit costs and control complexity.

FIG. 4 is a flowchart of another switching power supply control method according to an embodiment of the present application. Based on the preceding embodiments, in an embodiment, referring to FIG. 1, the switching power supply further includes an absorption circuit Q, where the absorption circuit Q is connected in parallel to two ends of the primary winding X1 and includes a fifth resistor R5 and a first capacitor C1 connected in series with each other.

In an embodiment, the control method further includes the step described below.

In the case where the output load of the switching power supply changes and the switching current of the first switching transistor is less than a second preset value, the primary control module controls the switching current of the first switching transistor to maintain at the second preset value and changes the frequency of a drive signal of the first switching transistor to adjust the output voltage of the switching power supply.

In an embodiment, the control method further includes the step described below.

In the case where the output load of the switching power supply changes and the switching time interval of the second switching transistor is less than or equal to the first preset value, the secondary control module readjusts the second switching transistor so that the voltage waveform at the first connection point reaches zero.

As shown in FIG. 4, the control method includes the steps described below.

In step 310, in the case where a switching time interval of the second switching transistor is less than or equal to a first preset value after the high-voltage startup of the switching power supply, the secondary control module acquires a voltage waveform at the second connection point between the secondary winding and the second switching transistor.

In step 320, in the case where the voltage waveform at the second connection point has not achieved ZVS, the secondary control module adjusts the cut-off current of the second switching transistor until a voltage waveform at the first connection point between the primary winding and the first switching transistor just reaches zero.

In step 330, in the case where the primary control module detects, through the first voltage divider circuit, that the voltage waveform at the first connection point just reaches zero, the primary control module controls the first switching transistor to be turned on to achieve the zero-voltage turn-on of the first switching transistor.

In step 340, in the case where an output load of the switching power supply changes and the switching time interval of the second switching transistor is less than or equal to the first preset value, the secondary control module acquires the output voltage of the switching power supply through the second voltage divider circuit and generates an optocoupler drive signal.

In step 350, the optocoupler generates a current feedback signal according to the optocoupler drive signal.

In step 360, the primary control module adjusts the peak current of the first switching transistor according to the current feedback signal to achieve the loop control for stabilizing the output voltage of the switching power supply.

In step 370, in the case where the output load of the switching power supply changes and the switching current of the first switching transistor is less than a second preset value, the primary control module controls the switching current of the first switching transistor to maintain at the second preset value and changes the frequency of a drive signal of the first switching transistor to adjust the output voltage of the switching power supply.

The method for setting the second preset value may be set using either the initial setup value of the switching power supply or a user-defined value.

It is to be understood that when the output load of the switching power supply changes and the switching current of the first switching transistor M1 is less than the second preset value, due to the change in output load, the switching power supply switches from the heavy load state to a light load state. Based on this, in the case where the switching power supply switches to the light load state, the primary control module K1 controls the switching current of the first switching transistor M1 to maintain at the second preset value and changes the frequency of the drive signal of the first switching transistor M1 according to the signal fed back by the optocoupler P to adjust the output voltage of the switching power supply, that is, the efficiency of the switching power supply is optimized through frequency adjustment.

For example, step 370 may be implemented in the manner described below.

In the case where the output load of the switching power supply changes and the switching current of the first switching transistor M1 is less than the second preset value, the primary control module K1 controls the switching current of the first switching transistor M1 to maintain near the second preset value based on an appropriate anti-jitter threshold, thereby making the peak current and the source reference voltage of the first switching transistor M1 in a steady state. Then, the primary control module K1 adaptively adjusts the time interval between the successive turn-ons of the first switching transistor M1 according to the feedback signal of the optocoupler P at this time and adjusts the output voltage of the switching power supply through frequency adjustment.

In step 380, in the case where the output load of the switching power supply changes and the switching time interval of the second switching transistor is less than or equal to the first preset value, the secondary control module readjusts the second switching transistor so that the voltage waveform at the first connection point reaches zero.

When the output load of the switching power supply changes and the switching time interval of the second switching transistor M2 is less than or equal to the first preset value, due to the change in the output load, the switching time interval of the second switching transistor M2 switches from being greater than the first preset value to being less than or equal to the first preset value and the switching power supply switches from the light load state to the heavy load state. It is to be understood that at this time, the secondary control module K2 needs to repeat steps 310 and 320 to readjust the voltage waveform at the first connection point A to reach zero.

To sum up, on the basis that the ZVS of the switching power supply in the heavy load state is achieved and the output voltage of the switching power supply maintains a steady state in the preceding embodiments, in the case where the switching power supply switches from the heavy load state to the light load state, in this embodiment, the efficiency of the switching power supply in the light load state is optimized through frequency adjustment. In addition, in the case where the switching power supply switches from the light load state to the heavy load state, in this embodiment, the voltage waveform at the first connection point A can be readjusted to reach zero to achieve the ZVS of the switching power supply. Compared with related art, in this embodiment, the real-time switching between the light-load frequency adjustment mode and the heavy load ZVS mode according to the output load change of the switching power supply can be achieved without increasing the additional circuit costs and control complexity, thereby not only reducing the switching losses of the switching power supply but also improving the EMI characteristics of the switching power supply.

With continued reference to FIG. 1, the switching power supply includes the primary winding X1, the secondary winding X2, the primary control module K1, the secondary control module K2, the first switching transistor M1 connected to the primary winding X1, the second switching transistor M2 connected to the secondary winding X2, the first connection point A between the primary winding X1 and the first switching transistor M1, and the second connection point B between the secondary winding X2 and the second switching transistor M2.

The primary winding X1 is configured to store energy in the case where the first switching transistor M1 is turned on.

The secondary winding X2 is configured to generate an output voltage in the case where the second switching transistor M2 is turned on.

The first switching transistor M1 is configured to be turned on or off according to a drive signal generated by the primary control module K1.

The second switching transistor M2 is configured to be turned on or off according to a drive signal generated by the secondary control module K2.

The primary control module K1 is configured to, in the case where the voltage waveform at the first connection point A just reaches zero, control the first switching transistor M1 to be turned on; the primary control module K1 is further configured to adjust the peak current of the first switching transistor M1 according to a current feedback signal; and the primary control module K1 is further configured to, in the case where an output load of the switching power supply changes and the switching current of the first switching transistor M1 is less than a second preset value, control the switching current of the first switching transistor M1 to maintain at the second preset value and change the frequency of a drive signal of the first switching transistor M1.

The secondary control module K2 is configured to, in the case where a switching time interval of the second switching transistor M2 is less than or equal to a first preset value after the high-voltage startup of the switching power supply, acquire the voltage waveform at the second connection point B between the secondary winding X2 and the second switching transistor M2; the secondary control module K2 is further configured to, in the case where the voltage waveform at the second connection point B has not achieved ZVS, adjust the cut-off current of the second switching transistor M2 until the voltage waveform at the first connection point A between the primary winding X1 and the first switching transistor M1 just reaches zero; the secondary control module K2 is further configured to, in the case where the output load of the switching power supply changes, acquire the output voltage of the switching power supply through a second voltage divider circuit E2 and generate an optocoupler drive signal; and the secondary control module K2 is further configured to, in the case where the output load of the switching power supply changes and the switching time interval of the second switching transistor M2 is less than or equal to the first preset value, readjust the second switching transistor M2 so that the voltage waveform at the first connection point A reaches zero.

The first connection point A is configured to provide the voltage waveform at a connection end between the first switching transistor M1 and the primary winding X1.

The second connection point B is configured to provide the voltage waveform at a connection end between the second switching transistor M2 and the secondary winding X2.

For example, the first switching transistor M1 and the second switching transistor M2 may be, but are not limited to, metal-oxide-semiconductor field-effect transistors (MOSFETs). It is to be understood that the specific type selection and structural parameters of the first switching transistor M1 and the second switching transistor M2 are related to the power supply requirement to be achieved and are not limited in the embodiment of the present application.

It can be seen that the primary control module K1 may be further configured to, in the case where the voltage waveform at the first connection point A approaches zero, control the first switching transistor M1 to be turned on.

It is to be understood that the secondary control module K2 is further configured to, in the case where the output load of the switching power supply changes and the switching time interval of the second switching transistor M2 is less than or equal to the first preset value, readjust the second switching transistor M2 so that the voltage waveform at the first connection point A reaches zero, which means that the secondary control module K2 is further configured to, in the case where the output load of the switching power supply changes and the switching time interval of the second switching transistor M2 switches from being greater than the first preset value to being less than or equal to the first preset value, readjust the second switching transistor M2 so that the voltage waveform at the first connection point A reaches zero.

In an embodiment, the switching power supply further includes the auxiliary winding X3 and the first voltage divider circuit E1, where the first voltage divider circuit E1 includes a first resistor R1 and a second resistor R2.

The auxiliary winding X3 is configured to provide electrical power for the primary control module K1.

The first voltage divider circuit E1 is configured to generate a first voltage divider signal so that the primary control module K1 acquires the voltage waveform at the first connection point A.

In an embodiment, the switching power supply further includes the optocoupler P and the second voltage divider circuit E2, where the second voltage divider circuit E2 includes a third resistor R3 and a fourth resistor R4.

The optocoupler P is configured to generate the current feedback signal according to the optocoupler drive signal.

The second voltage divider circuit E2 is configured to generate a second voltage divider signal so that the secondary control module K2 acquires the output voltage of the switching power supply.

In an embodiment, the switching power supply further includes an absorption circuit Q, where the absorption circuit Q includes a fifth resistor R5 and a first capacitor C1 connected in series with each other.

It is to be understood that compared with the clamp absorption circuits widely used in related technologies, which typically consist of resistors, capacitors, and diodes, the absorption circuit Q provided in the embodiment of the present application can implement a simpler clamp absorption function, thereby further reducing the hardware cost of the switching power supply, optimizing the switching losses of the system, and improving the EMI characteristics of the switching power supply.

It is to be noted that the first resistor R1, the second resistor R2, the third resistor R3, the fourth resistor R4, and the fifth resistor R5 may be any type of resistors, and the types and specific parameters of the preceding resistors may be adaptively adjusted according to the power supply requirement to be achieved by the switching power supply and are not limited in the embodiment of the present application. For example, the preceding resistors may be surface mount device (SMD) resistors.

Further, it is to be noted that the first capacitor C1 may be any type of capacitor, and the type and specific parameters of the capacitor may be adaptively adjusted according to the power supply requirement to be achieved by the switching power supply and are not limited in the embodiment of the present application. For example, the first capacitor C1 may be a mica capacitor.

In addition, the circuit element connection relationship of the switching power supply based on the typical flyback AC-DC isolated switching power supply topology provided in the embodiment of the present application is shown in FIG. 1, and the details are not repeated here.

With continued reference to FIG. 1, the working process of the switching power supply is described below.

Firstly, in the case where the switching time interval of the second switching transistor M2 is less than or equal to the first preset value after the high-voltage startup of the switching power supply, the secondary control module K2 acquires the voltage waveform at the second connection point B. Secondly, in the case where the voltage waveform at the second connection point B has not achieved ZVS, the secondary control module K2 adjusts the cut-off current of the second switching transistor M2 until the voltage waveform at the first connection point A between the primary winding X1 and the first switching transistor M1 just reaches zero. Thirdly, in the case where the voltage waveform at the first connection point A just reaches zero, the primary control module K1 controls the first switching transistor M1 to be turned on to achieve the zero-voltage turn-on of the first switching transistor. Fourthly, the primary control module K1 acquires the feedback signal from an optocoupler P to generate a voltage reference value for controlling the voltage at the source of the first switching transistor M1, which corresponds to the peak current of the first switching transistor M1. In the case where the voltage at the source of the first switching transistor M1 reaches the voltage reference value, the primary control module K1 controls the first switching transistor M1 to be turned off. Fifthly, in the case where an output load of the switching power supply changes and the switching time interval of the second switching transistor M2 is less than or equal to the first preset value, the secondary control module K2 acquires the output voltage of the switching power supply through the second voltage divider circuit E2 and generates an optocoupler drive signal. Sixthly, the optocoupler P generates the current feedback signal according to the optocoupler drive signal. Seventhly, the primary control module K1 adjusts the peak current of the first switching transistor M1 according to the current feedback signal to achieve the loop control for stabilizing the output voltage of the switching power supply. Eighthly, in the case where the output load of the switching power supply changes and the switching current of the first switching transistor M1 is less than a second preset value, the primary control module K1 controls the switching current of the first switching transistor M1 to maintain at the second preset value and changes the frequency of a drive signal of the first switching transistor M1 to adjust the output voltage of the switching power supply. Finally, in the case where the output load of the switching power supply changes and the switching time interval of the second switching transistor M2 is less than or equal to the first preset value, the secondary control module K2 readjusts the second switching transistor M2 so that the voltage waveform at the first connection point A reaches zero.

It is to be noted that the secondary control module K2 in the embodiment of the present application may be integrated with a typical 431 reference module internally or an external 431 reference module may be used so that the comparison between the output voltage of the switching power supply and the module reference voltage provided by the 431 reference module is achieved, so as to generate the optocoupler drive signal.

Figure 5:
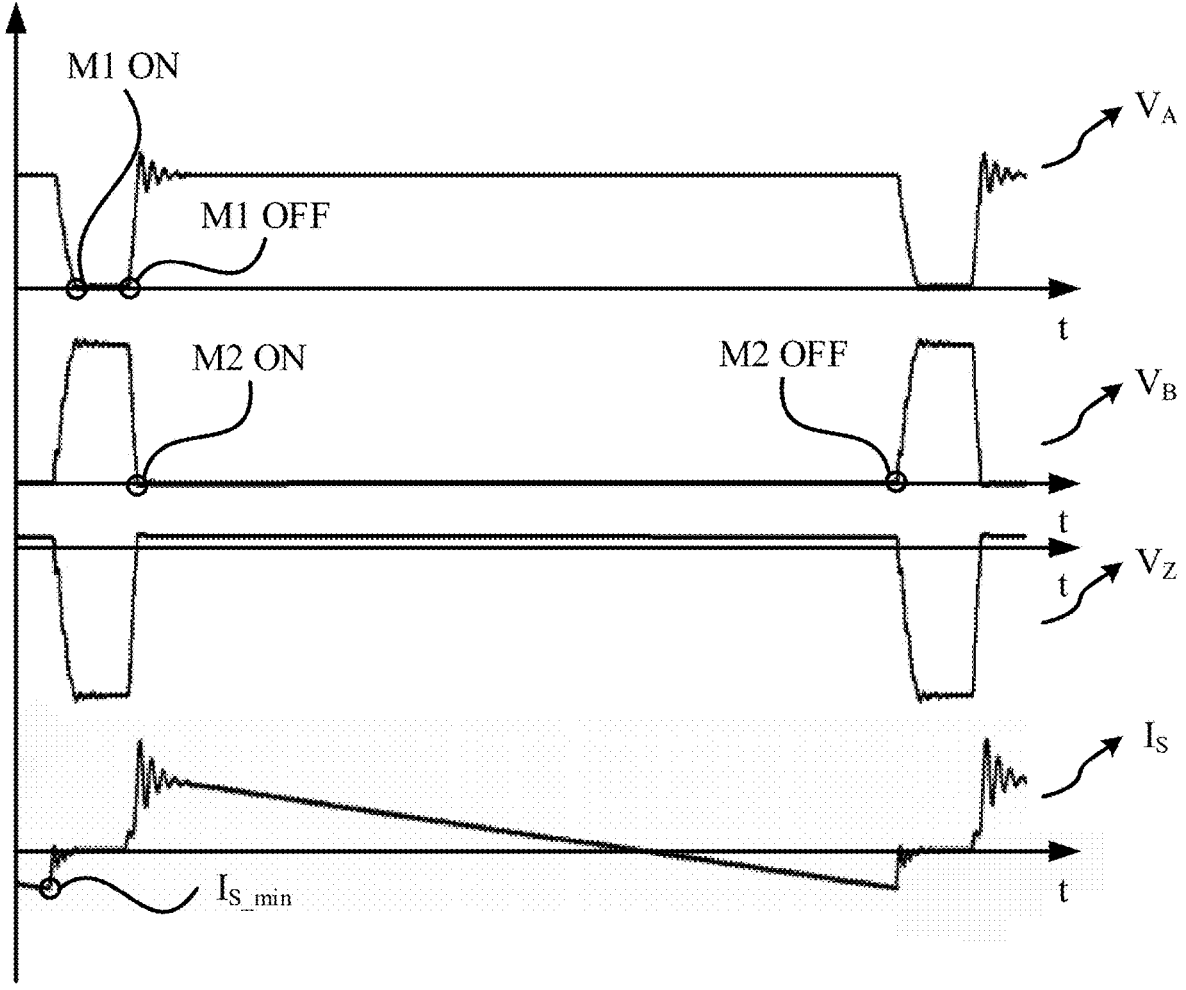
FIG. 5 is a schematic diagram illustrating waveforms of a switching power supply according to an embodiment of the present application.

FIG. 5 is a schematic diagram illustrating waveforms of a switching power supply according to an embodiment of the present application. Referring to the working process of the preceding switching power supply and FIG. 5, it can be seen that in the case where the waveform of the voltage $V_A$ of the first connection point A just reaches zero, the waveform of the voltage $V_B$ of the second connection point B just reaches a high level, and the waveform of the voltage $V_z$ of a third connection point Z just reaches a low level. In addition, at the time when the second switching transistor M2 is to be turned off, the switching current $I_S$ of the second switching transistor M2 reaches the cut-off current $I_{S\_min}$.

The ZVS of the switching power supply in the heavy load state can be achieved in the embodiments of the present application. On the basis that the output voltage of the switching power supply maintains a steady state, in the case where the switching power supply switches from the heavy load state to the light load state, in this embodiment, the efficiency of the switching power supply in the light load state is optimized through frequency adjustment. In addition, in the case where the switching power supply switches from the light load state to the heavy load state, in this embodiment, the voltage waveform at the first connection point can be readjusted to reach zero to achieve the ZVS of the switching power supply.

M1 ON indicates that the first switching transistor M1 is turned on, and M1 OFF indicates that the first switching transistor M1 is turned off. M2 ON indicates that the second switching transistor M2 is turned on, and M2 OFF indicates that the second switching transistor M2 is turned off. t denotes time.

Compared with the related art, in this embodiment, the real-time switching between the light-load frequency adjustment mode and the heavy load ZVS mode according to the output load change of the switching power supply can be achieved without increasing the additional circuit costs and control complexity, thereby not only reducing the switching losses of the switching power supply but also improving the EMI characteristics of the switching power supply.

In an embodiment, the primary control module K1 may include, but is not limited to, the following main function modules: a drive module of the first switching transistor M1 configured to control the first switching transistor M1 to be turned on and off; a switching transistor current detection module; a waveform detection module configured to detect the moment when $V_Z$ just reaches the low level; an opto-coupler feedback current detection and system loop control module (configured to adjust the peak current of the first switching transistor M1 according to the current feedback signal in the heavy load state to achieve the loop control for stabilizing the output voltage of the switching power supply; or in case of the light load, control the switching current of the first switching transistor M1 to maintain at the second preset value and change the frequency of the drive signal of the first switching transistor M1 according to the signal fed back by the optocoupler P to adjust the output voltage of the switching power supply); and a voltage regulator circuit and a reference voltage module configured to generate the operating voltage and reference voltage of the internal circuit.

In an embodiment, the secondary control module K2 may include, but is not limited to, the following main function modules: a drive module of the second switching transistor M2 configured to control the second switching transistor M2 to be turned on and off; a switching transistor current detection module and a cut-off current control module; a waveform detection module configured to detect the moment when $V_B$ just reaches the high level; a waveform zero-reaching control module configured to implement an effect of the $V_A$ waveform just reaching zero; an output feedback voltage detection and optocoupler signal generation module; a voltage regulator circuit and a reference voltage module configured to generate the operating voltage and reference voltage of the internal circuit.

The above are only some embodiments of the present application and the technical principles used therein. It will be understood by those skilled in the art that the present application is not limited to the specific embodiments described herein. Those skilled in the art can make various modifications, readjustments, and substitutions without departing from the scope of the present application. Therefore, while the present application is described in detail in conjunction with the preceding embodiments, the present application is not limited to the preceding embodiments and may include more other equivalent embodiments without departing from the concept of the present application. The scope of the present application is determined by the scope of the appended claims.

What is claimed is:

1. A zero voltage switching control method for a switching power supply, wherein the switching power supply comprises a primary winding, a secondary winding, a primary control module, a secondary control module, a first switching transistor connected to the primary winding, and a second switching transistor connected to the secondary winding;

wherein the method comprises:

in response to a switching time interval of the second switching transistor being less than or equal to a first preset value after high-voltage startup of the switching power supply, acquiring, by the secondary control module, a voltage waveform at a second connection point between the secondary winding and the second switching transistor, wherein the switching time interval of the second switching transistor is a time interval between turn-off and turn-on of the second switching transistor;

in response to the voltage waveform at the second connection point not achieving zero voltage switching, adjusting, by the secondary control module, a cut-off current of the second switching transistor until a voltage waveform at a first connection point between the primary winding and the first switching transistor just reaches zero; and in response to the voltage waveform at the first connection point just reaching zero, controlling, by the primary control module, the first switching transistor to be turned on to achieve zero-voltage turn-on of the first switching transistor;

wherein the switching power supply further comprises an auxiliary winding and a first voltage divider circuit, wherein the first voltage divider circuit is connected between the auxiliary winding and a voltage detection terminal of the primary control module, and the first voltage divider circuit is configured to generate a first voltage divider signal so that the primary control module acquires the voltage waveform at the first connection point;

in response to the voltage waveform at the first connection point just reaching zero, controlling, by the primary control module, the first switching transistor to be turned on to achieve the zero-voltage turn-on of the first switching transistor comprises:

in response to the primary control module detecting, through the first voltage divider circuit, that the voltage waveform at the first connection point just reaching zero, controlling, by the primary control module, the first switching transistor to be turned on to achieve the zero-voltage turn-on of the first switching transistor.

2. The method of claim 1, wherein the switching power supply further comprises an optocoupler and a second voltage divider circuit, wherein the optocoupler is connected between an optocoupler output port of the primary control module and a current drive port of the secondary control module, and the second voltage divider circuit is connected between the secondary winding and an output voltage detection terminal of the secondary control module;

wherein the method further comprises:

in response to an output load of the switching power supply changing and the switching time interval of the second switching transistor being less than or equal to the first preset value, acquiring, by the secondary control module, an output voltage of the switching power supply through the second voltage divider circuit and generating an optocoupler drive signal;

generating, by the optocoupler, a current feedback signal according to the optocoupler drive signal; and adjusting, by the primary control module, a peak current of the first switching transistor according to the current feedback signal to achieve loop control for stabilizing the output voltage of the switching power supply.

3. The method of claim 2, further comprising:

in response to the output load of the switching power supply changing and a switching current of the first switching transistor being less than a second preset value, controlling, by the primary control module, the switching current of the first switching transistor to maintain at the second preset value and changing a frequency of a drive signal of the first switching transistor to adjust the output voltage of the switching power supply.

4. The method of claim 3, further comprising:

in response to the output load of the switching power supply changing and the switching time interval of the second switching transistor being less than or equal to the first preset value, readjusting, by the secondary control module, the second switching transistor so that the voltage waveform at the first connection point reaches zero.

5. The method of claim 1, wherein the switching power supply further comprises an absorption circuit, wherein the absorption circuit is connected in parallel to two ends of the primary winding and comprises a fifth resistor and a first capacitor connected in series with each other.

6. A switching power supply, comprising a primary winding, a secondary winding, a primary control module, a secondary control module, a first switching transistor connected to the primary winding, and a second switching transistor connected to the secondary winding;

wherein the primary winding is configured to store energy in response to the first switching transistor being turned on;

the secondary winding is configured to generate an output voltage in response to the second switching transistor being turned on;

the first switching transistor is configured to be turned on or off according to a drive signal generated by the primary control module;

the second switching transistor is configured to be turned on or off according to a drive signal generated by the secondary control module;

the primary control module is configured to:

control the first switching transistor to be turned on in response to a voltage waveform at a first connection point just reaching zero;

adjust a peak current of the first switching transistor according to a current feedback signal; and in response to an output load of the switching power supply changing and a switching current of the first switching transistor being less than a second preset value, control the switching current of the first switching transistor to maintain at the second preset value and change a frequency of the drive signal generated by the primary control module; and the secondary control module is configured to:

in response to a switching time interval of the second switching transistor being less than or equal to a first preset value after high-voltage startup of the switching power supply, acquire a voltage waveform at a second connection point between the secondary winding and the second switching transistor, wherein the switching time interval of the second switching transistor is a time interval between turn-off and turn-on of the second switching transistor;

in response to the voltage waveform at the second connection point not achieving zero voltage switching, adjust a cut-off current of the second switching transistor until the voltage waveform at the first connection point between the primary winding and the first switching transistor just reaches zero;

in response to the output load of the switching power supply changing, acquire the output voltage of the switching power supply through a second voltage divider circuit and generate an optocoupler drive signal; and in response to the output load of the switching power supply changing and the switching time interval of the second switching transistor being less than or equal to the first preset value, readjust the second switching transistor so that the voltage waveform at the first connection point reaches zero;

wherein the switching power supply further comprises:

an auxiliary winding and a first voltage divider circuit, wherein the first voltage divider circuit comprises a first resistor and a second resistor;

the auxiliary winding is configured to provide electrical power for the primary control module; and the first voltage divider circuit is configured to generate a first voltage divider signal so that the primary control module acquires the voltage waveform at the first connection point.

7. The switching power supply of claim 6, further comprising an optocoupler and the second voltage divider circuit, wherein the second voltage divider circuit comprises a third resistor and a fourth resistor;

the optocoupler is configured to generate the current feedback signal according to the optocoupler drive signal; and the second voltage divider circuit is configured to generate a second voltage divider signal so that the secondary control module acquires the output voltage of the switching power supply through the second voltage divider circuit.

8. The switching power supply of claim 7, further comprising an absorption circuit, wherein the absorption circuit comprises a fifth resistor and a first capacitor connected in series with each other.

9. The method of claim 4, wherein the switching power supply further comprises an absorption circuit, wherein the absorption circuit is connected in parallel to two ends of the primary winding and comprises a fifth resistor and a first capacitor connected in series with each other.

* * * * *